United States Patent Office 3,460,119
Patented Aug. 5, 1969

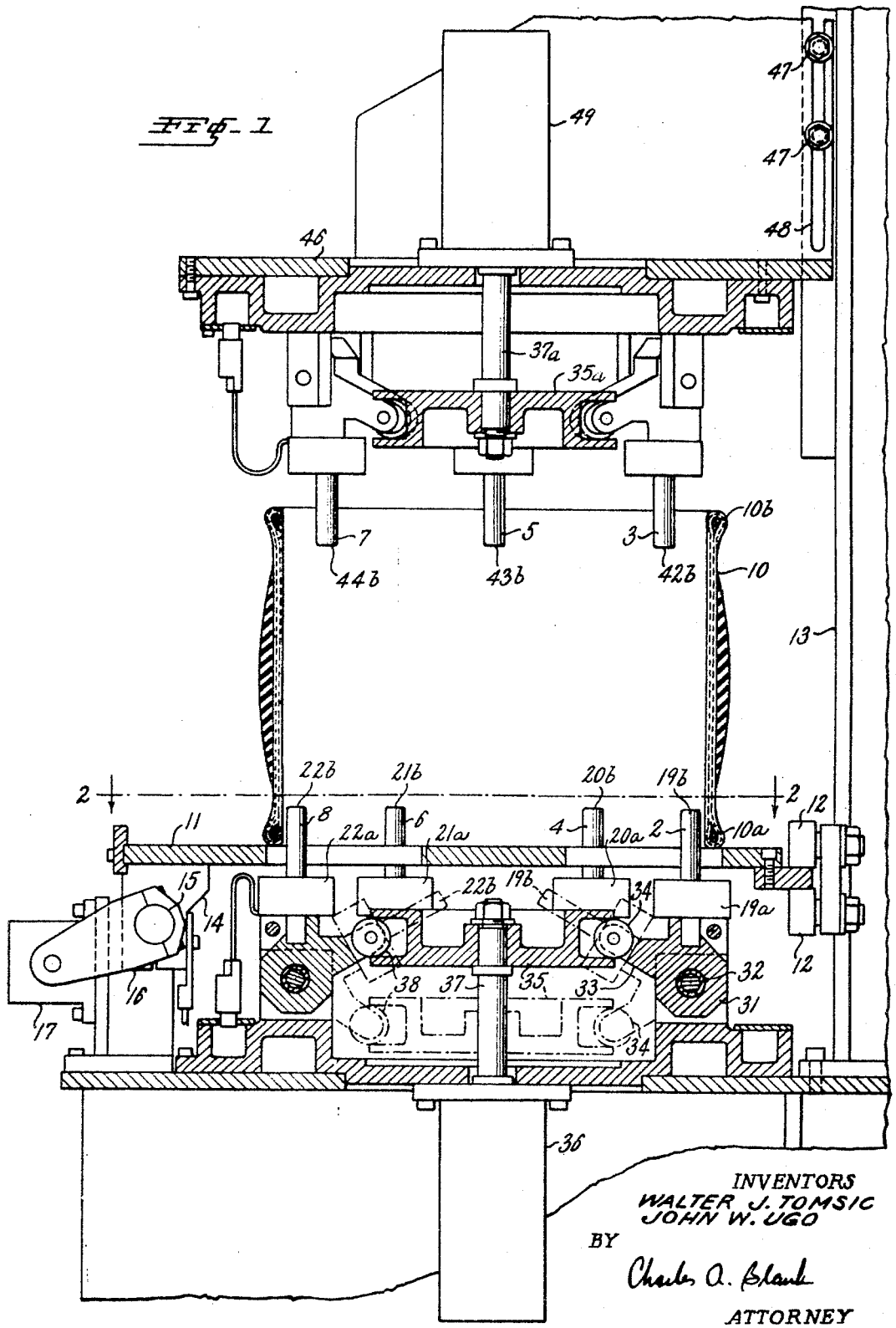

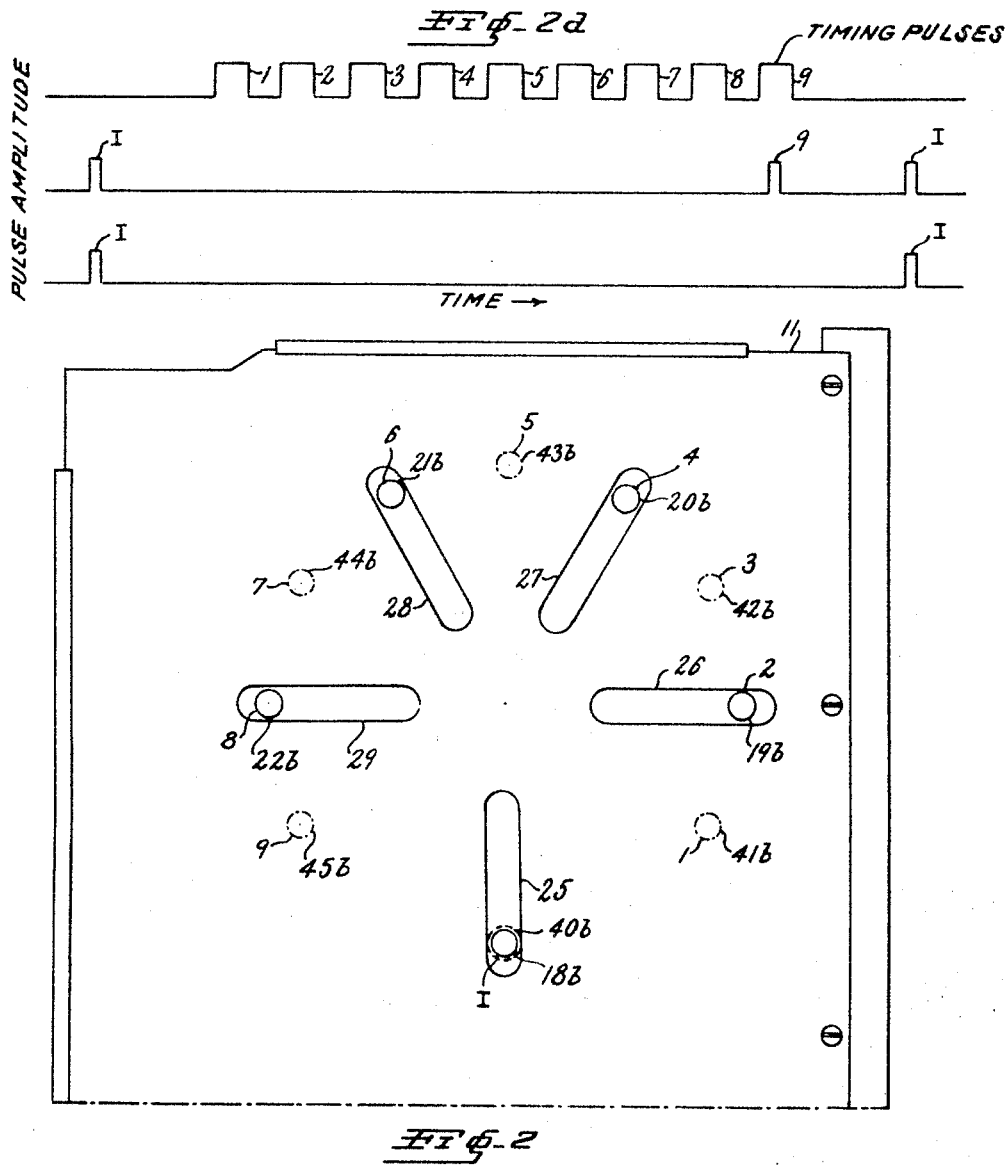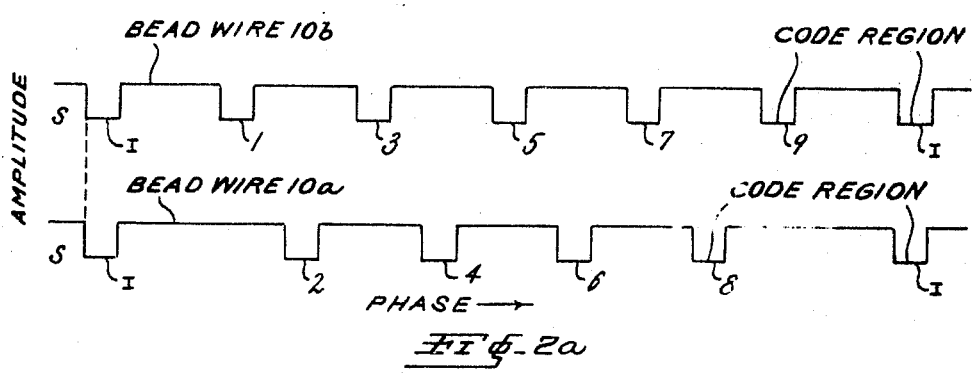

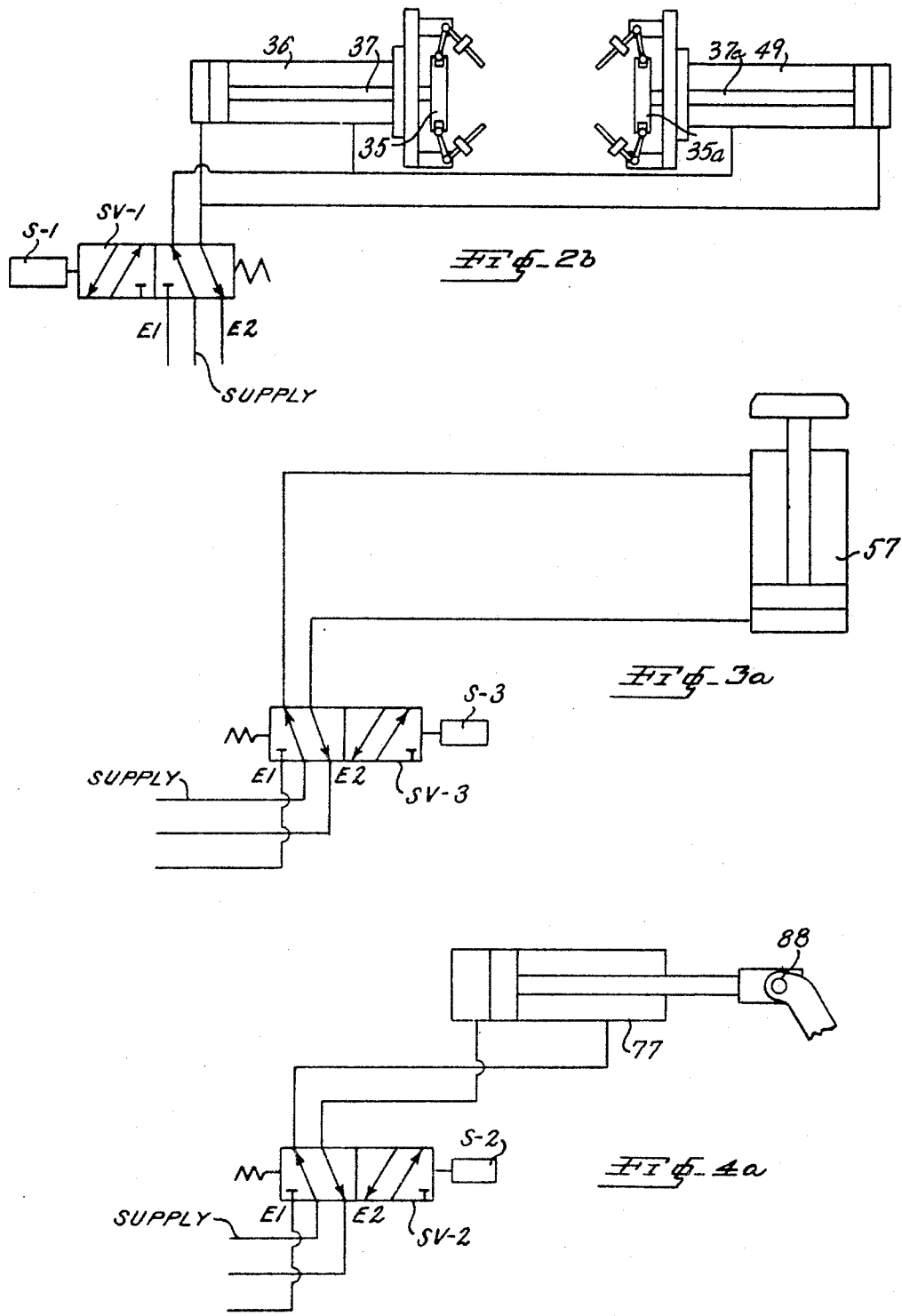

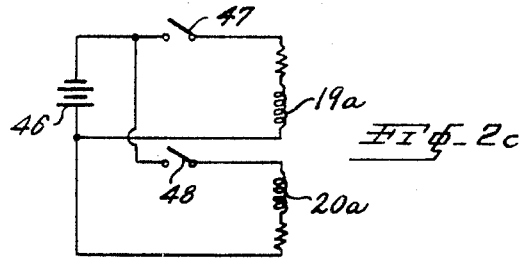
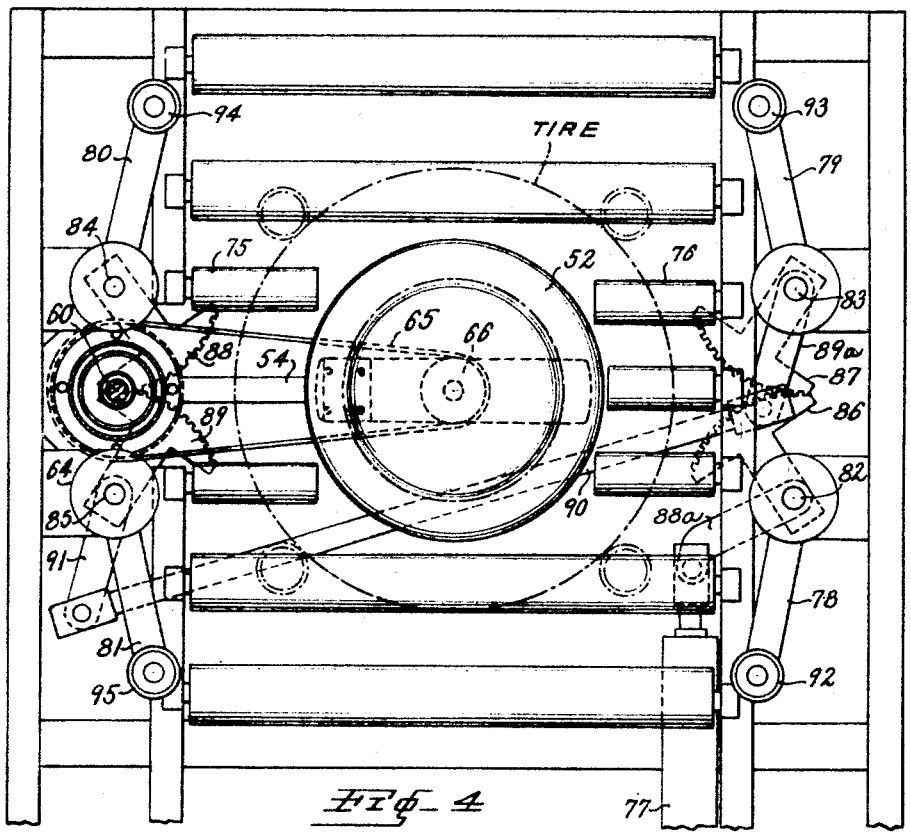
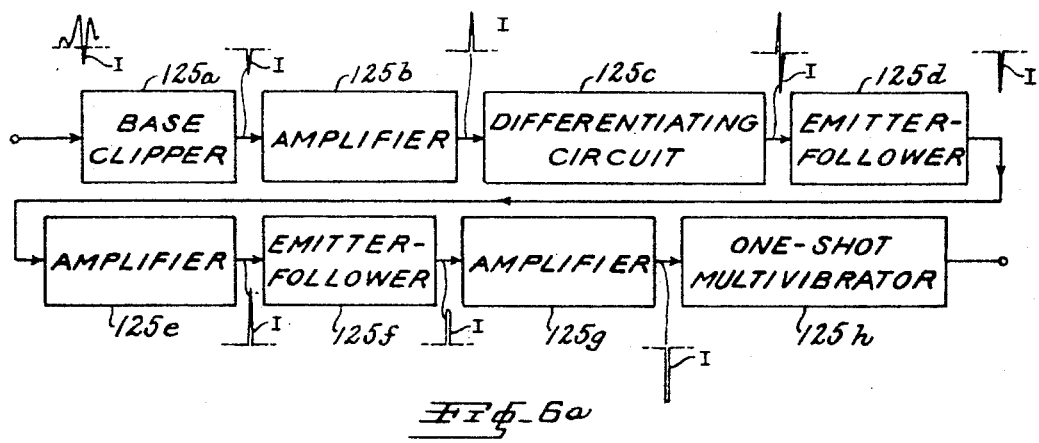

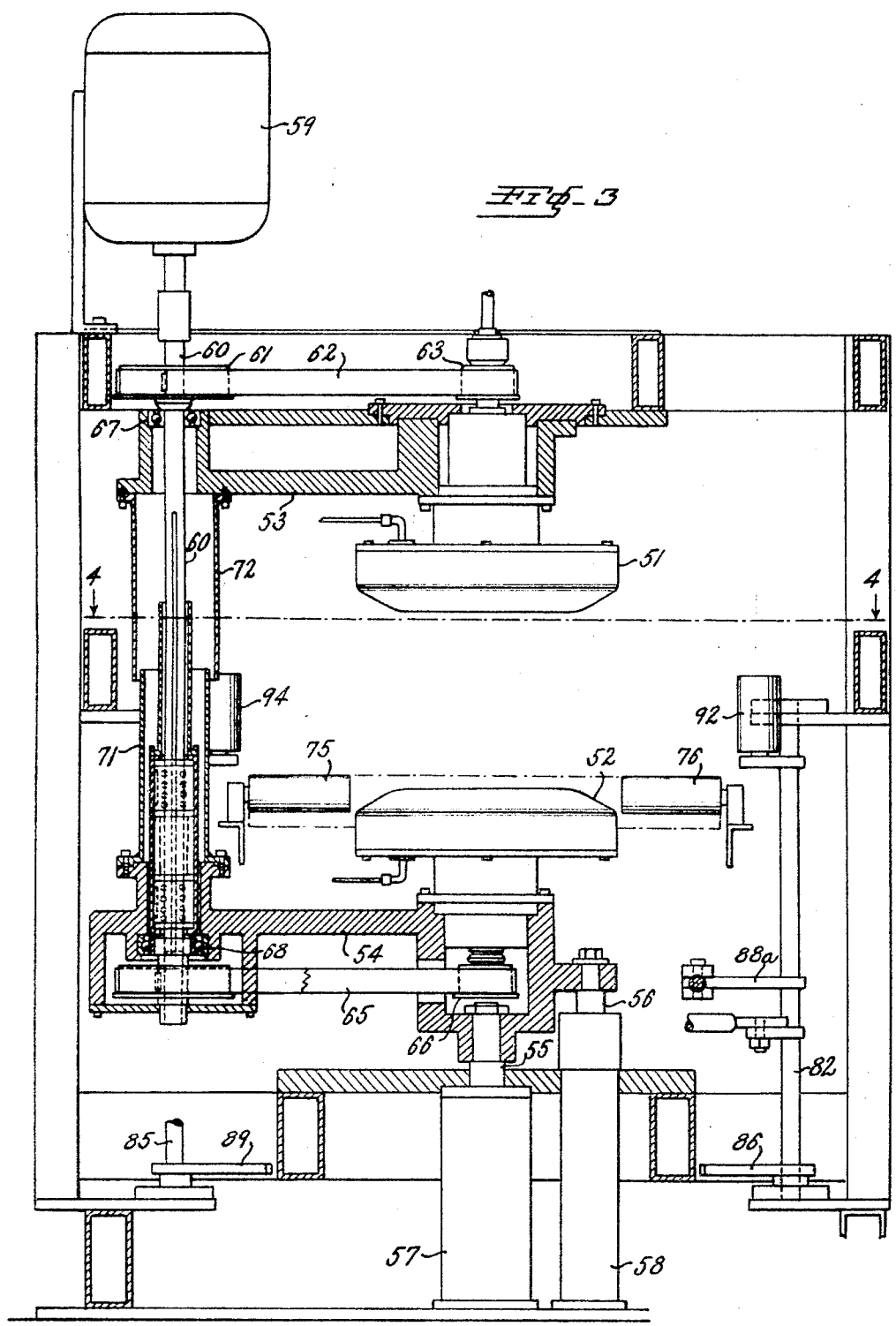

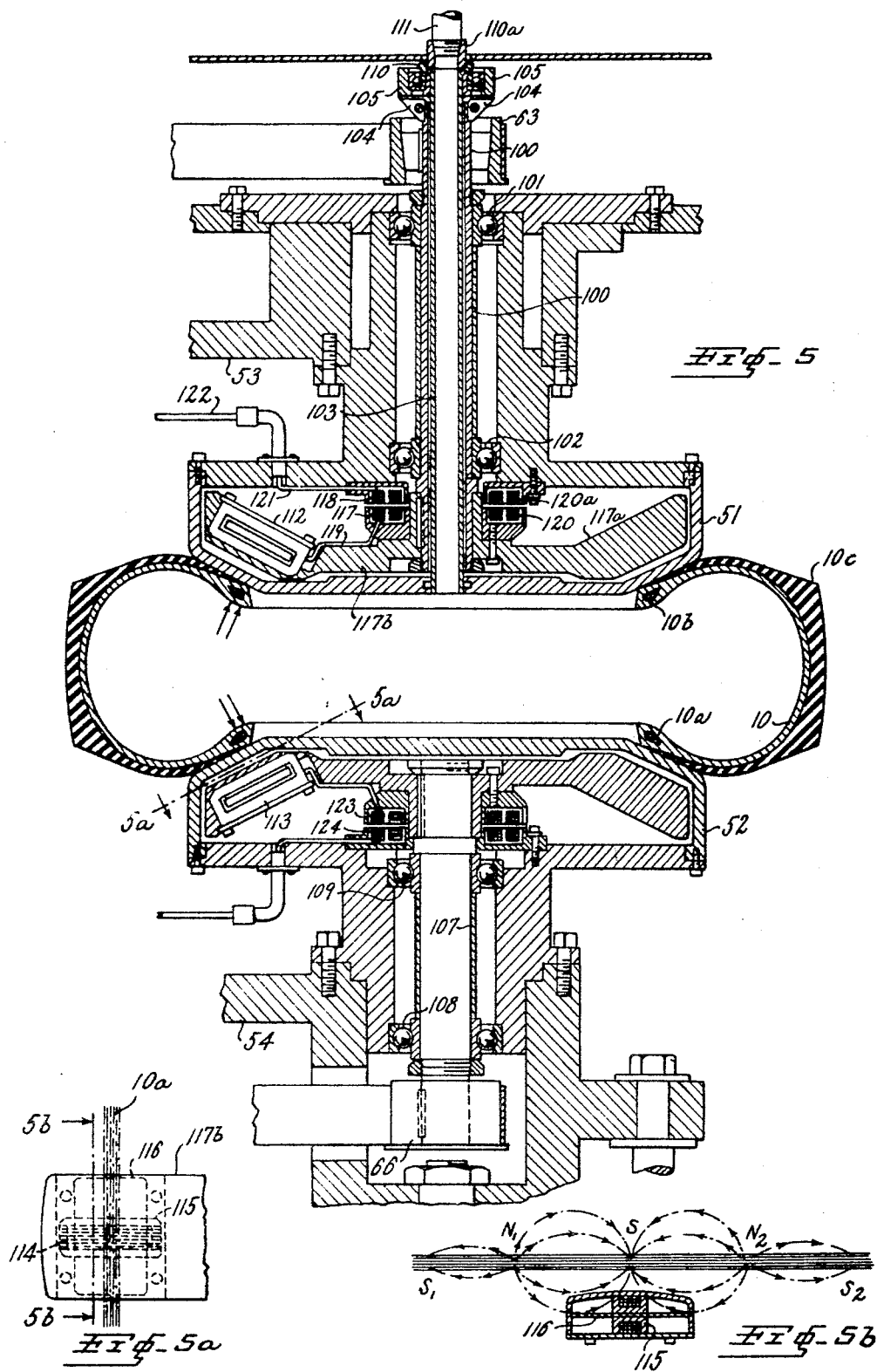

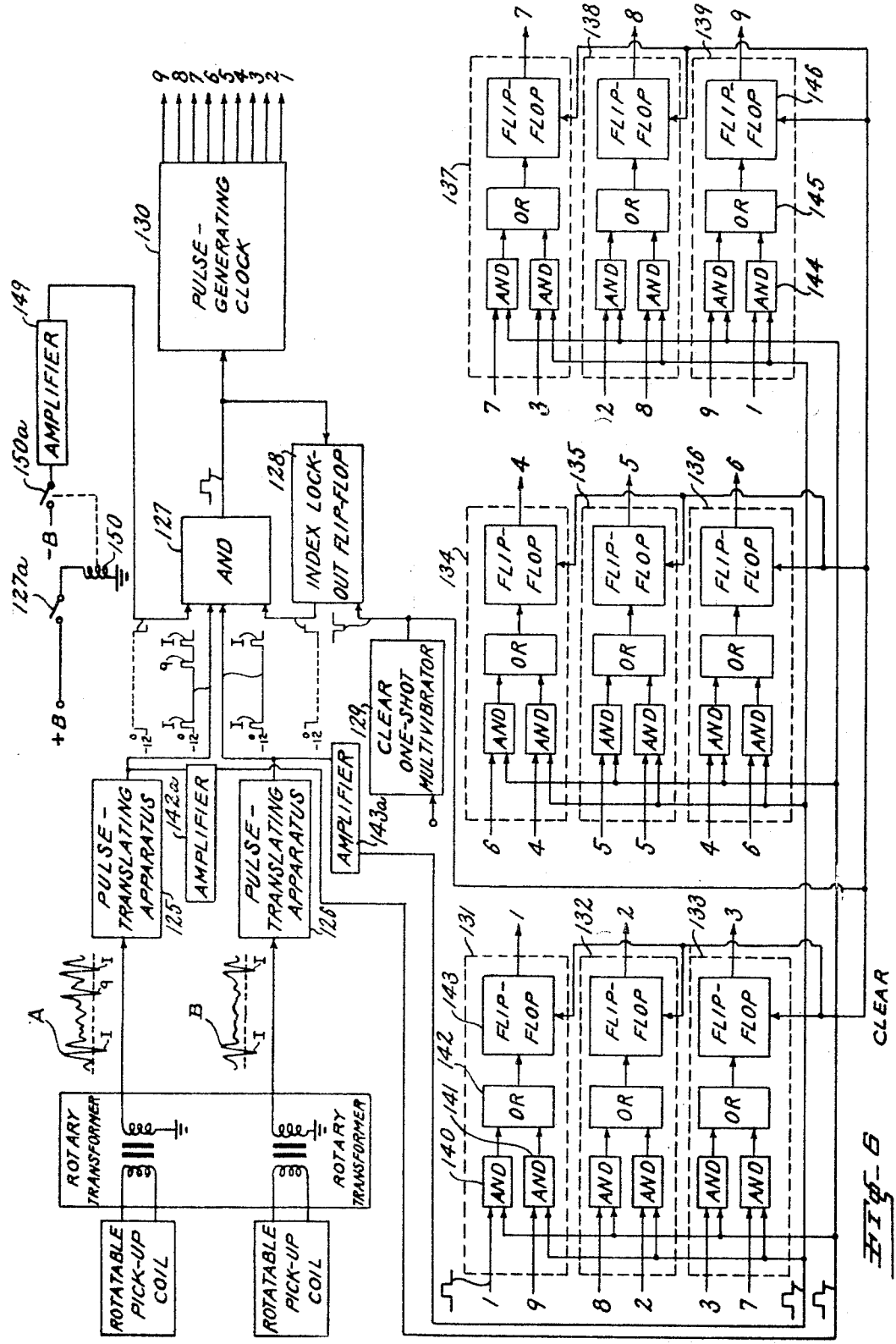

3,460,119
APPARATUS FOR MAGNETICALLY CODING AND DECODING PNEUMATIC TIRE MEMBERS
John W. Ugo, Detroit, and Walter J. Tomsic, Warren, Mich., assignors to Uniroyal, Inc., a corporation of New Jersey
Filed Aug. 20, 1965, Ser. No. 481,181
Int. Cl. G11b 5/74, 7/00
U.S. Cl. 340—174.1                 10 Claims

ABSTRACT OF THE DISCLOSURE

A digital magnetic code containing both an indexing digit and information digits is placed circumferentially on both sides of a tire carcass. Synchronously rotatable magnetic transducers are disposed on both sides of the tire to code the tire.

---

This invention relates to apparatus for recording a digital magnetic code on a member of a tire carcass or the like and to apparatus for decoding the magnetic code.

Tires having magnetically coded bead wires and methods and apparatus for coding the same have been described and claimed in Patent 2,920,674—Bull. Apparatus for decoding the magnetization of such bead wires has been described and claimed in Patent 3,179,929—Tourtellotte. Automatic signal-translating apparatus suitable for use in such decoding is described and claimed in Patent 3,160,865—Tourtellotte.

It is an object of the invention to provide a new and improved system for recording information on a member of a tire carcass or the like and for deriving the information therefrom.

It is another object of the invention to provide a new and improved apparatus for recording a digital magnetic code on a member of a tire carcass or the like.

It is another object of the invention to provide a new and improved apparatus for decoding a digital magnetic code on a member of a tire or the like.

It is another object of the invention to provide a new and improved apparatus for recording a binary digital magnetic code on a member of a tire carcass or the like.

It is another object of the invention to provide a new and improved apparatus for decoding a binary digital magnetic code on a member of a tire or the like.

It is another object of the invention to provide a new and improved apparatus for coding and decoding a binary digital magnetic code on a member of a tire or the like with the tire in either a reference or inverted position.

In accordance with the invention, apparatus for recording a digital magnetic code having an indexing digit and information digits on magnetizable means extending circumferentially of a tire carcass or the like in opposite regions thereof comprises a first plurality of magnetizing members adapted to be positioned circumferentially of one of the magnetizable means. The apparatus includes a second plurality of magnetizing members adapted to be positioned circumferentially of the other of the magnetizable means. One of the magnetizing members of the first plurality is disposed in predetermined alignment with one of the magnetizing members of the second plurality to code the magnetizable means with the indexing digit. The others of the first plurality of magnetizing members are differently aligned with respect to the others of the second plurality of magnetizing means to code the magnetizable members with the information digits.

Also in accordance with the invention, there is provided apparatus for decoding a digital magnetic code including an indexing digit and information digits disposed circumferentially around a tire axis at a radial distance therefrom on members of a tire or the like on opposite sides of the tire with a digit on each member having a predetermined reference to a digit on the other member to represent the indexing digit and with the information digits on each member being differently referenced to each other from the digits representative of the indexing digit. The apparatus comprises a pair of synchronously rotatable magnetic pick-up means disposed on opposite sides of the tire and rotatable circumferentially of the tire around the tire axis at a radial distance from the tire axis approximately equal to the radial distance of the magnetic code digits from the tire axis for developing from the digits representative of the indexing digit electrical code pulses having a predetermined time relation to represent the indexing digit and for developing the electrical code pulses representative of the information digits. The apparatus also includes an indexing-digit detector and a pair of rotatable means, coupled to the pair pick-up means, and coupled to the indexing-digit detector, for translating to the indexing-digit detector the electrical code pulses which are representative of the indexing digit and the information digits. The apparatus also includes means for rotating the pair of pick-up means and the pulse-translating means synchronously. The apparatus also includes means coupled to the indexing-digit detector for developing timing pulses. The indexing-digit detector is selectively responsive to those of the code pulses derived from both members and having the aforesaid predetermined time relation to represent the indexing digit for actuating the timing-pulse developing means for developing timing pulses representative of the occurrence times of those of the code pulses representative of the information digits. The apparatus also includes circuit means coupled to the pair of rotatable pulse-translating means and to the timing-pulse developing means. The last-mentioned circuit means is responsive to the electrical code pulses representative of the information digits and to the timing pulses for separating the last-mentioned code pulses to represent individually the information digits of the magnetic code and for storing the separated pulses to represent the information digits.

For a better understanding of the present invention, together with other and further objects thereof, reference is made to the following description, taken in connection with the accompanying drawings, and its scope will be pointed out in the appended claims.

Referring now more particularly to the drawings:

FIG. 1 is a sectional view of apparatus constructed in accordance with the invention for recording a digital magnetic code on the bead wires of a tire carcass;

FIG. 2 is a sectional view, taken along line 2—2 of FIG. 1, of a portion of the FIG. 1 apparatus supporting the tire carcass;

FIG. 2a is a pulse amplitude-phase graph representing the relations between coded digits on the two beads of the tire carcass;

FIG. 2b is a schematic pneumatic diagram representing the system for controlling cylinders of the FIG. 1 apparatus;

FIG. 2c is an electrical circuit diagram representing the energizing circuits for the electromagnets of the FIG. 1 apparatus;

FIG. 2d is a pulse amplitude-time graph representing the relations between timing pulses and information pulses;

FIG. 3 is an elevational view, partly in section and with parts broken away, of apparatus constructed in accordance with the invention for decoding the digital magnetic code on the bead wires of the tire;

FIG. 3a is a schematic pneumatic diagram of the control system for actuating the lift cylinder of the FIG. 3 apparatus;

FIG. 4 is a sectional view, taken along line 4—4 of FIG. 3, with portions of the FIG. 3 apparatus broken away for clarity;

FIG. 4a is a schematic pneumatic diagram of the control system for the centering device of FIG. 4;

FIG. 5 is a fragmentary view to an enlarged scale, in section, of the FIG. 4 decoding apparatus gripping a tire;

FIG. 5a is a fragmentary view, in section, taken along line 5a–5a of FIG. 5 to represent the magnetic pick-up head of the FIG. 5 apparatus;

FIG. 5b is a view, in section, taken along line 5b—5b of FIG. 5a; and

FIG. 6 is a circuit diagram, partly schematic, of the decoding circuits of the apparatus.

FIG. 6a is a schematic circuit diagram of a portion of the circuits of the FIG. 6 apparatus.

Referring now more particularly to FIG. 1 of the drawings, there is represented apparatus constructed in accordance with the invention for recording a digital magnetic code having an indexing digit and information digits on magnetizable members extending circumferentially of a tire carcass or the like in opposite regions thereof. A tire carcass 10 having bead wires 10a, 10b is positioned on a shuttle plate 11, also represented in FIG. 2, supported by rollers 12, 12 on frame 13 and by a mounting bracket 14 attached to rod 15 which is, in turn, attached through collar 16 to the piston of a suitable cylinder 17 for displacing the shuttle plate along the rollers 12, 12. The shuttle plate 11 may also be manually positioned.

The apparatus includes a first plurality of magnetizing members adapted to be positioned circumferentially of one of the magnetizable members of the tire carcass. The magnetizing members comprise electromagnets having coils 18a–22a and cores 18b–22b (with only coils 19a–22a and cores 19b–22b being shown in FIG. 1 of the drawings).

The cores 18b–22b extend through slots 25–29, inclusive, of the shuttle plate 11, as represented in FIG. 2. With the slot 25 taken as a reference at 0°, the slots 26–29 and the cores 18b–22b preferably are positioned at 0°, 90°, 150°, 210° and 270°, respectively. The electromagnets are pivotally mounted so that they are retractable through slots 25–29 when the tire carcass is moved into position on the shuttle plate 11, as will be apparent with reference to FIG. 1. To this end, the cores of the electromagnets are mounted in suitable blocks for example, block 31 rotatable about shaft 32 under the control of an arm 33 having a roller 34 seated in an aperture in annular member 35 actuated by a cylinder and piston 36, 37. Alternate positions of the core 19b, the control roller 34 and annular member 35 are represented in broken-line construction in the drawing. The remaining electromagnets are pivotable in a similar manner, with the alternate position of the core 22b and its control roller 38 being also represented in broken-line construction in the drawing of FIG. 1.

The recording apparatus also includes a second plurality of magnetizing members adapted to be positioned circumferentially of the other of the magnetizable members, namely, bead wire 10b. The second plurality of magnetizing members comprises electromagnets having cores 40b–45b, inclusive, of which cores 42b–44b are represented in FIG. 1. The positions of the cores 40b–45b are represented diagrammatically in FIG. 2 as projections upon the shuttle tray 11 to represent the relative positions of the cores 40b–45b with reference to the cores 18b–22b, inclusive. The cores 40b–45b preferably are positioned at 0°, 60°, 120°, 180°, 240° and 300°, respectively. Referring to FIG. 1, the second plurality of magnetizing members is pivotally mounted in a manner similar to the first plurality of magnetizing members. The second plurality of magnetizing members is mounted from a suspension bracket 46 adjustably positioned on support 13 by means of studs 47 in slot 48 of the bracket 46. A cylinder and piston 49, 37a actuate an annular member 35a similar to the annular member 35 for pivoting the electromagnets by means of their associated control are arms.

Referring now more particularly to FIG. 2 of the drawings, one of the magnetizing members of the first plurality is disposed in predetermined alignment with one of the magnetizing members of the second plurality to code the magnetizable members of the tire carcass with the indexing digit, designated I. The magnetizing members of the first and second pluralities which are in circumferential alignment are the magnetizable members having cores 18b and 40b. The others of the first plurality of magnetizing members are differently aligned with respect to the others of the second plurality of magnetizing members to code the magnetizable members with the information digits. Thus, the magnetizing members having cores 19b, 20b, 21b, and 22b are displaced from circumferential alignment with respect to the magnetizing members having cores 41b, 42b, 43b, 44b and 45b.

Referring now more particularly to FIG. 2a, the phase relationships of the indexing and information digits represented by code regions on the bead wires of the tire are diagrammatically represened in idealized form for clarity, assuming that all the electromagnets are energized. The code regions of the indexing digit are designated I and are formed at 0° phase reference by the magnetizing members having cores 18b and 40b. The code regions of the information digits are designated 1–9 and are formed by magnetizing members having cores 41b, 19b, 42b, 20b, 43b, 21b, 44b, 22b, 45b respectively, occurring at 60°, 90°, 120°, 150°, 180°, 210°, 240°, 270°, 300°, respecively. The phase width of the individual code regions may, for example, be 15°. The indexing and information digits may, for example, have a width of two degrees and may fall anywhere within the corresponding code regions.

As is apparent in FIG. 2a, the digits on the two bead wires are of the same magnetic polarity, for example, South poles. As will be explained more fully subsequently, the electrical connections in the decoding apparatus between the pick-up means and rotatable means is such that the pulses derived by the rotatable means have the same polarity whether the tire is in a reference or inverted condition in the decoding apparatus.

Referring now more particularly to FIG. 2b of the drawings, there is represented a schematic pneumatic diagram of the control system for positioning the electromagnets of FIG. 1 with their cores inside the bead wires of the carcass. To this end, a suitable spring-return solenoid valve SV–1 is utilized to actuate the cylinders 36 and 49 under the control of solenoid S–1. The valve is represented in its normally unactuated condition, with the pistons 37 and 37a being retracted. When the solenoid S–1 is energized, for example, by coupling to a suitable electrical source through a manual switch or through control relay contacts, the valve SV–1 shifts position, thereby coupling an air supply to the cylinders in such manner as to extend pistons 37, 37a. Air exhausts are designated E–1 and E–2. When the solenoid is de-energized, the solenoid valve returns to the condition represented in the drawing and the pistons are retracted.

When the cores of the electromagnets are positioned within the tire carcass as represented in FIG. 1, the electromagnets may be selectively energized by individually connecting the coil of each electromagnet to a suitable direct-current source 46 and through manually controlled switches 47, 48 as represented, for example, in FIG. 2c for two representative electromagnet coils 19a, 20a. The energizing circuits for the remaining electromagnets are similar to those of FIG. 2c.

Referring now more particularly to FIG. 3 of the drawings, there is represented, in section, a fragmentary view of apparatus for decoding a digital magnetic code including an indexing digit and information digits disposed circumferentially around a tire axis at a radial distance therefrom on members of the tire on opposite sides of the tire with digit on each member having a predetermined reference to a digit on the other member to represent the index and with the information digits on each member being differently referenced to each other from the digits representative of the index. The FIG. 3 apparatus comprises a frame support for a pair of synchronously rotatable magnetic pick-up means, more fully described hereinafter, mounted within housing 51, 52 of non-magnetic material, for example, aluminum. The housing 51 is bolted to a supporting member 53 of the frame support 50. The housing 52 is bolted to a supporting member 54 mounted on piston rod 55, or lift cylinder 57 and adapted for vertical displacement to support or chuck a tire, as will be more fully explained subsequently. Guide rod 56 in sleeve 58 provides horizontal stability for the member 54. The housings 51, 52 are of tapered cross section for supporting tires of different sizes in the bead regions thereof.

A synchronous motor 59 is mounted on the frame support 50 for supplying a rotary drive to the magnetic pick-up means within housings 51, 52 by means of spline shaft 60 in conjunction with pulley and belt drives 61, 62, 63 and 64, 65, 66. The spline shaft 60 is rotatably mounted in the frame 50 in suitable bearings 67 and a suitable ball guide assembly 69. The pulley 64 and the bearing 68 are mounted on an outer sleeve of ball guide assembly 69. The outer sleeve supports ball cages having around their circumferences vertical grooves for balls which are partially seated in the cages and partially seated in the spline shaft 60 to key the spline shaft rotationally to the outer sleeve of the ball guide assembly 69. The guide assembly 69 seated around the spline shaft 60 allows vertical movement of the lower chuck assembly 52, 54 and keys the pulley 64 to the spline shaft 60 to supply rotational drive to the pulley 64 which, in turn, drives the lower pick-up means. A suitable telescoping cover 71, 72 houses the spline shaft 60.

Referring now more particularly to FIGS. 3 and 4 of the drawings, the apparatus may include suitable centering apparatus for positioning a tire on a table of conveyor rolls 75, 76 mounted on the frame support. The centering apparatus is actuated by a pneumatic cylinder 77, which may be manually or automatically controlled. The centering mechanism comprises four arms 78, 79, 80, 81 mounted on shafts 82, 83, 84, 85, respectively, rotatable on the supporting frame 50. Gears 86, 87, 88, 89 are attached to the shafts 82, 83, 84, 85, respectively, for rotating the shafts to displace the centering arms 78, 79, 80, 81 respectively, in response to actuation by cylinder 77 which is connected to the centering arms by means of links 88a, 89a, 90, 91. Suitable rollers 92, 93, 94, 95 are mounted on arms 78, 79, 80, 81, respectively for engagement with the tread of the tire. The centering mechanism is represented in solid-line construction in its open position, corresponding to the unactuated condition of cylinder 77, and the rollers are represented in broken-line construction in their positions corresponding to the actuated condition of cylinder 77.

Considering now the operation of the FIG. 3 apparatus with reference to the diagram of FIG. 4a, when a tire is positioned on the rollers 75, 76, a spring-return solenoid valve SV-2 under the control of solenoid S-2 may be actuated from a conventional electrical circuit. The valve is represented in its normally unactuated condition, and upon energization of the solenoid S-2, the valve is displaced to couple the air supply and the exhaust E-1 to the centering cylinder 77 in such manner as to extend the piston of the cylinder and rotate the centering arms 92, 93, 94, 95 into contact with the tire to center the tire. The solenoid S-2 may then be deenergized, returning the centering arms to their retracted position represented in FIG. 4a.

Referring to FIG. 3a, spring-return solenoid valve SV-3 may then be actuated under the control of solenoid S-3 to displace the lift cylinder 57 to its extended condition to raise the tire into the position represented in FIG. 5. After completion of the decoding operation to be described subsequently, the solenoid S-3 may be deenergized to lower the tire.

Referring now more particularly to FIG. 5 of the drawings, there is represented, in section, a fragmentary view to an enlarged scale of the FIG. 3 apparatus with the housing 52 displaced vertically upward to chuck a tire between the housings 51, 52. The tire comprises the carcass 10 and tread 10c after curing with the magnetized bead wires 10a, 10b therein. As is apparent in FIG. 5, the pulley 63 is keyed to a shaft 100 rotatably mounted with respect to the housing 51 and the support 53 by means of suitable bearings 101, 102. A stationary inner air supply tube 103 for inflating the tire is mounted in the housing 51 and extends through a rotatable collar 104 on shaft 100 to a suitable air supply. The collar 104 is attached to the outer rotatable race of a bearing 105 having a stationary inner race on the tube 103. A suitable nut 110 clamps bearing 105 in position. An air supply tube 111 is threaded in sleeve 110a welded to the tube 103.

The pulley 66 is keyed to shaft 107 rotatably mounted in suitable bearings 108, 109 in support member 54. The shafts 100 and 107, drive a pair of synchronously rotatable magnetic pick-up means 112, 113 and a pair of rotatable pulse translating means 117, 123. The pick-up means 112, 113 are disposed on opposite sides of the tire and rotatable circumferentially of the tire around the tire axis at a radial distance from the tire axis approximately equal to the radial distance of the code digits from the tire axis for developing from the digits representative of the indexing digit electrical code pulses having a predetermined time relation to represent the indexing digit and for developing electrical code pulses representative of the information digits.

The magnetic pick-up means preferably are similar to one another and the magnetic pick-up means 112 in the housing 51 will be described in detail. The magnetic pick-up means 112 preferably comprises a coil of wire 114 wound around a suitable frame 115 having a magnetic shield vane 116 extending through the loop to isolate one portion of the coil from the magnetic field of the bead wires, as represented in FIGS. 5a and 5b. The coil is supported on a suitable nonmagnetic aluminum rotatable member 117b, which may be of uniform width as represented in FIG. 5a, and has a counterbalance portion 117a generally providing an overall propeller shape, as may also be seen in FIG. 4. Support 117b, 117a is mounted on the rotatable shaft 100. The magnetic pick-up means 112, 113 preferably are disposed opposite in circumferential alignment on opposite sides of the tire and are rotated synchronously.

The decoding apparatus also includes a pair of rotatable means coupled to the pair of pick-up means and coupled to an indexing-digit detector to be described subsequently for translating electrical code pulses representative of the indexing digit and the information digits to the indexing-digit detector. The rotatable means just mentioned comprises a pair of transformers 117, 118 and 123, 124 having rotatable primary windings 117, 123 coupled to the pick-up means 112, 113 and having stationary secondary windings 118, 124, respectively, coupled to the indexing-digit detector to be described. More particularly, the pick-up coil 112 is connected by wires 119 to the primary winding 117 of rotatable transformer 117, 118. The transformer 117, 118 preferably has annular E-shaped laminations 120, 120a with the primary and secondary windings extending circumferentially around the transformer and disposed between the branches of the E-shaped laminations 120, 120a, respectively. The secondary winding of the transformer is of similar construction to the primary winding but has a larger number of turns, and the output connections 121 from the secondary winding extend through a flexible cable 122 to the electronic decoding apparatus. The transformer may be of the general type described in the above-mentioned Patent 3,160,865.

As mentioned previously, the indexing and information digits fall within the code regions of FIG. 2a. FIG. 5b is a representation of the flux lines produced from a single magnetic code region S on a bead wire. The coder develops the magnetic mark in code region S to represent an information digit. The return flux lines from the code region S induce secondary magnetic regions $N_1$, $N_2$ of opposite polarity and $S_1$, $S_2$ of the same polarity but greatly diminished in magnitude relative to the code region S. As the pick-up coil scans the bead wire, a generally sinusoidal electrical signal is generated in the pick-up coil as represented for example, by signals A and B of FIG. 6, assuming indexing marks I and information mark 9 are the only marks of the code. The generally sinusoidal signal contains the information and index pulses and also contains secondary undesired pulses. The secondary pulses do not form part of the code and are eliminated in the electrical pulse-translating apparatus to be described before reaching the indexing-digit detector. As used herein, the term pulse in reference to index or information digits translated by the pick-up coils and rotatable transformers refers to a component of the generally sinusoidal signal translated through the pick-up coils and rotatable transformers and measured relative to a suitable reference line.

Referring now more particularly to FIG. 6 of the drawings, the rotatable pick-up apparatus 112, 113 are represented schematically as being coupled to rotary transformers 117, 118 and 123, 124, respectively. The secondary windings 118, 124 of the rotary transformers are coupled to suitable pulse-translating apparatus 125, 126, respectively. For example, each pulse-translating apparatus may comprise a suitable amplifier coupled to a conventional base clipper with an adjustable bias level having its output circuit coupled to a one-shot multivibrator for developing a rectangular output pulse in response to each input pulse of given polarity (for example, negative) beyond a predetermined base level applied to the pulse-translating apparatus, thereby eliminating noise and other undesired pulses not representative of the code. As represented in FIG. 6a, the coupling network between the base clipper 125a and the one-shot multivibrator preferably includes amplifier 125b coupled to a differentiating network 125c for differentiating the base-clipped input pulse, thereby providing a timing pulse effective to render the emitter-follower 125d conductive substantially at the occurrence time of the zero-slope peak portion of the input pulse. Amplifier 125e, emitter-follower 125f and amplifier 125g translate the output pulse of emitter-follower 125d to cause the timing of the output pulse of the one-shot multivibrator 125h to be controlled by the zero-slope peak portion of the input pulse. The output circuits of the pulse-translating apparatus 125, 126 are coupled to the indexing-digit detector mentioned previously.

The indexing-digit detector preferably comprises AND circuit 127, which is selectively responsive to those of the code pulses having, for example, positive polarity and derived from both bead wires and having the predetermined time relation, preferably time coincidence or simultaneous occurrence, to represent the index by an output pulse from the AND circuit. The output pulse from the AND circuit is effective to actuate timing-pulse developing means comprising clock 130, more fully described subsequently, for developing timing pulses representative of the occurrence times of those of the code pulses representative of the information digits. The AND circuit 127 is of a type which develops an output pulse only when all of the input signals supplied thereto are of the same polarity, for example, positive polarity.

A second input circuit of the AND circuit 127 is coupled to the output circuit of an amplifier 149 which may, for example, actuated through control relay contacts 150a to develop a read enable output pulse when the tire is positioned as represented in FIG. 5. A suitable manually or automatically operated switch 127a may be closed to energize control relay 150 to develop a pulse. The duration of the output pulse of the amplifier 149 is sufficiently long to allow at least slightly more than one revolution of the pick-up means so that the derivation of the indexing-digit pulses from the pick-up means is assured. The speed of rotation of the pick-up means may, for example, be 1800 revolutions per minute.

A third input circuit of the AND circuit 127 is coupled to the output circuit of a flip-flop 128 of conventional construction, which provides a positive output signal until the AND circuit is actuated by the occurrence of simultaneous indexing pulses to develop an output pulse representing a detected index. The output pulse from the AND circuit alters the operating condition of the flip-flop 128 to provide, for example, a zero output signal level to prevent the AND circuit from responding to more than the first simultaneous occurrence of the indexing pulses.

The apparatus also includes a one-shot multivibrator 129 for clearing or resetting the flip-flop 128 and other flip-flops to be described subsequently after the code has been read from the magnetized bead wires. The one-shot multivibrator 129 may be manually or automatically actuated to provide a negative output pulse.

The apparatus also includes means coupled to the indexing-digit detector for developing timing pulses. This means comprises a pulse-generating clock of conventional construction constituted, for example, by a series of one-shot multivibrators which are sequentially triggered after actuation of the first of the series by the output signal of the AND circuit 127. The timing pulses are developed on separate output circuits 1–9, inclusive, and have time occurrences relative to the index pulse corresponding to the time occurrences of the pulses of all the information digits which may be derived from the bead wires. For example, for the code represented in FIG. 2d, the timing pulses developed in output circuits 1–9, inclusive, of the clock 130 correspond to the occurrence times of the information digits as the information pulse 9 is developed by the rotating pick-up coils 112, 113 of FIG. 5.

The decoding apparatus also includes logic and memory circuits coupled to the pair of rotatable pulse-translating means comprising the rotary transformers and to the timing-pulse developing means comprising the clock 130. The logic and memory circuits are responsive to the electrical code pulses representative of the information digits and to the timing pulses applied thereto for separating the last-mentioned code pulses to represent individually the information digits of the magnetic code and for storing the separated pulses to represent the information digits. The logic and memory circuits preferably are of similar construction. For example, the logic and memory circuits of unit 131 comprise a pair of AND circuits 140, 141 having input circuits coupled to the pulse-translating apparatus 125, 126, respectively, through amplifiers 142a, 143a, respectively. The other input circuits of the AND circuits 140, 141 are coupled to the 1 and 9 output circuits of the one-shot multivibrators of the clock 130, as indicated by the numerals 1 and 9. As will be explained more fully subsequently, this coupling, in conjunction with the other circuits described, is effective to permit the derivation of the first information digit in the logic and memory circuit 130, regardless of whether the tire is in a reference or inverted condition, that is, right side up or upside down, respectively, on the decoding apparatus represented in FIG. 5 with reference to its condition on the coding apparatus represented in FIG. 1.

The output circuits of the AND circuits 140, 141 are coupled to an OR circuit 142, which responds to a pulse translated through either of the AND circuits to supply an output pulse which is effective to trigger a flip-flop 143 having, for example, zero and negative output signal levels. The output circuit of the flip-flop 143 is designated as a number 1 bit or digit output circuit because a signal stored by the flip-flop 143 corresponds to the information region number 1 of FIG. 2a, as will be more fully explained subsequently.

The remaining logic and memory units 132–139, inclusive, include AND circuits, OR circuits and flip-flop circuits of a similar construction to the logic and memory unit 131 and are coupled in the manner indicated in the drawing to the clock 130. That is, for example, the input circuits to the logic and memory unit 132 are supplied with the timing pulses 8 and 2, and the output circuit supplies an output signal representing an information bit or digit 2.

Considering now the operation of the decoding apparatus with reference to the schematic diagram of FIG. 6, the rotatable pick-up coils 112, 113 develop electrical code pulses in response to the magnetic code marks on the bead wires of the tire. The code regions may, for example, be in the pattern of FIG. 2a to form each code. One or more of the information marks may be omitted to form different codes. The electrical code pulses are applied through rotary transformers 117, 118 and 123, 124 to the pulse-translating apparatus 125, 126, respectively. The pulses from the upper bead wires 10b are then supplied through amplifier 142a to the logic and memory units, 131–139, inclusive, and the pulses from the lower bead wire 10a are supplied through amplifier unit 143a to the logic and memory units 131–129, inclusive. The amplifier 149 may then be actuated to translate read enable pulse preferably having a duration of at least slightly more than one-thirtieth second to allow one complete revolution of the magnetic pick-up apparatus 112, 113. The flip-flop 128 is in its normal or clear condition, qualifying one input of the AND circuit 127. Accordingly, when simultaneous indexing-digit pulses are derived by the pulse-translating apparatus 125, 126 and applied to the AND circuit 127, the AND circuit develops an output signal which represents the index and is effective to trigger the one-shot multivibrator 130 to develop positive-going timing pulses having the occurrence times of the information digits 1–9, inclusive, as derived from the code regions represented in FIG. 2a. The output pulse of the AND circuit 127 is also applied to the flip-flop 128 to cause that flip-flop to shift to its alternate operating condition to develop an output signal at, for example, a negative level and thereby render the AND circuit 127 non-conductive after the output pulse is developed by the AND circuit 127.

Assuming that the tire is in the reference condition, that is, right-side up, so that the information digits 1, 3, 5, 7 and 9 are on the upper bead wire, the information pulse 1 is supplied by the amplifier 142a to the AND circuit 140 at the same time that the timing pulse 1 is applied to the AND circuit 140, assuming a magnetic information mark 1 is present on the upper bead wire. The AND circuit 140 then develops an output pulse which is applied through the OR circuit 142 to the flip-flop 143 to actuate the flip-flop to provide, for example, a positive-going output signal level, indicating the presence of information pulse 1. The AND circuit 141 remains non-conductive because no information pulse is derived from the lower bead wire and is supplied by amplifier 143 at the time of the timing pulse 9.

In a similar manner, the information pulses 3, 5, 7 and 9, if represented by magnetic marks present on the upper bead wire, are translated by the amplifier 142a to the input circuits of the logic and memory units 133, 135, 137, and 139, causing the output circuits of those units to develop operating conditions indicating the presence of information digits 3, 5, 7 and 9.

Also, in a similar manner, the information digits 2, 4, 6 and 8 from the bottom bead wire are applied to the logic and memory units 132, 134, 136, and 138 from amplifier 143a at the same time that timing pulses 2, 4, 6 and 8, respectively, are applied to those logic and memory units. Accordingly, the output circuits of the logic and memory units 2, 4, 6 and 8 develop, for example, positive-going output signal levels, indicating the existence of information digits 2, 4, 6 and 8, if magnetic marks representing those information digits are present on the lower bead wire.

If any information pulse is omitted because of a different code on the bead wires, there is no actuation of the corresponding logic and memory unit and the absence of the information pulse is indicated, for example, by an unchanged output signal level of the logic and memory unit.

After the code has been developed in the output circuits of the logic and memory units 131–139, inclusive, the apparatus may be cleared under manual or automatic control by suitably actuating the clear one-shot multivibrator 129, which develops a negative output pulse effective to reset or clear the flip-flop 128 and the flip-flops of the logic and memory units 131–139, inclusive.

Assuming that the tire is in an inverted condition on the apparatus of FIG. 5, that is, upside down, then the pulses from the upper and lower bead wires are derived in a manner generally similar to that previously described. However, the amplifier 142a supplies pulses representing information marks 2, 4, 6, 8, if those marks are present on the upper bead wire, and amplifier 143a supplies pulses representing information marks 1, 3, 5, 7, 9, if those marks are present on the lower bead wire. The order of the pulses is also reversed with respect to the occurrence of the indexing digit I. In other words, the amplifier 142a supplies pulses representing marks in the following order: index pulse then information pulses 8, 6, 4, 2, respectively. The amplifier 143 supplies pulses representing marks in the following order: index pulse, then information pulses 9, 7, 5, 3, 1, respectively. The timing pulse 1 supplied by clock 130 then occurs at the time of information pulse 9. The information pulse 9 and timing pulse 1 are applied simultaneously to the AND circuit 144 of the logic and memory unit 139. The AND circuit 144 then develops an output pulse which is supplied through the OR circuit 145 to actuate the flip-flop 146 and to indicate the occurrence of pulse 9 by changing the output signal of the flip-flop 146 to, for example, a positive-going output signal level.

In a similar manner, information digit 7 occurs at time of timing pulse 3, information digit 5 occurs at the time of timing pulse 5, information digit 3 occurs at the time of timing pulse 7, and information digit 1 occurs at the time of timing pulse 9. The logic and memory units 137, 135, 133 and 131 are actuated accordingly. For example, the AND circuit 141 develops an output pulse which is supplied through the OR circuit 142 to the flip-flop 143 to actuate the flip-flop 143.

In a similar manner, pulses representing the information marks on the upper bead wire are supplied by the amplifier 142a, namely pulses representing any of information marks 8, 6, 4 and 2 present on the upper bead wire, are applied to logic and memory units 138, 136, 134 and 132, respectively, at the same time as timing pulses 2, 4, 6 and 8, respectively, to develop in the output circuits of the logic and memory units 138, 136, 134 and 132 operating conditions representing the information digits. Thus, the code is properly read regardless of whether the tire is in the reference or inverted condition.

If information pulses are omitted because of a different code on the bead wires, the corresponding logic and memory units are not actuated and provide, for example, unchanged output signal levels indicating the absence of the omitted information marks in the code.

Considering the logic and memory unit 131 as an example, the two timing pulses 1 and 9 applied to that unit correspond in time relationship to code pulses derived from information marks 1 and 9 when the tire is in the reference condition. The information marks 1 and 9 have the same circumferential space relation with respect to the indexing digit I under opposite direction of scan of the bead wires. The other logic and memory units 132–139 have timing pulses applied thereto in a similar manner so that the bead wires may be scanned and the code may be decoded with the tire in reversed positions, as explained previously.

From the foregoing description, it will be apparent that apparatus for recording a digital magnetic code on a member of a tire carcass and apparatus for decoding the magnetic code, constructed in accordance with the invention, have several advantages. The apparatus is capable of recording a digital magnetic code on both bead wires of the tire and the decoding apparatus is capable of decoding the code without reference to whether the tire is in a reference or inverted position. The information recorded and decoded may be used for inventory control and control of tire sorting and other manufacturing operations. Information on several tires may be decoded in several decoding machines at different locations, stored centrally and scanned to control the tire sorting at the several machine locations.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described our invention, what we claim and desire to protect by Letters Patent is:

1. Apparatus for recording a digital magnetic code having an indexing digit and information digits on magnetizable means extending circumferentially of a tire carcass or the like in opposite regions thereof comprising:
   a first plurality of magnetizing members adapted to be positioned circumferentially of one of the magnetizable means;
   a second plurality of magnetizing members adapted to be positioned circumferentially of the other of the magnetizable means;
   one of said magnetizing members of said first plurality being disposed in predetermined alignment with one of said magnetizing members of said second plurality to code the magnetizable means with the indexing digit and the other magnetizing members of said first plurality being differently aligned with respect to the other magnetizing members of said second plurality to code the magnetizable means with the information digits.

2. Apparatus for recording a digital magnetic code having an indexing digit and information digits on the bead wires of a tire carcass or the like comprising:
   a first plurality of magnetizing members adapted to be positioned circumferentially of one bead wire;
   a second plurality of magnetizing members adapted to be positioned circumferentially of the other bead wire;
   one of said magnetizing members of said first plurality being disposed in predetermined alignment with one of said magnetizing members of said second plurality to code the bead wires with the indexing digit and the other magnetizing members of said first plurality being differently aligned with respect to the other magnetizing members of said second plurality to code the bead wires with the information digits.

3. Apparatus for recording a digital magnetic code having an indexing digit and information digits on the bead wires of a tire carcass or the like comprising:
   a first plurality of magnetizing members adapted to be positioned circumferentially of one bead wire;
   a second plurality of magnetizing members adapted to be positioned circumferentially of the other bead wire;
   one of said magnetizing members of said first plurality being aligned circumferentially of the tire carcass with respect to one of said magnetizing members of said second plurality to code the bead wires with the indexing digit and the other magnetizing members of said first plurality being displaced from circumferential alignment with respect to the other magnetizing members of said second plurality to code the bead wires with the information digits.

4. Apparatus for recording a digital magnetic code having an indexing digit and information digits on the bead wires of a tire carcass or the like comprising:
   a first plurality of six magnetizing members adapted to be positioned circumferentially of one bead wire;
   a second plurality of five magnetizing members adapted to be positioned circumferentially of the other bead wire;
   one of said magnetizing members of said first plurality being aligned circumferentially of the tire carcass with respect to one of said magnetizing members of said second plurality to code the bead wires with the indexing digit and the other magnetizing members of said first plurality being substantially evenly spaced circumferentially of the tire carcass, the other magnetizing members of said second plurality being substantially evenly spaced circumferentially of the tire carcass with respect to said other magnetizing members of said first plurality to code the bead wires with the information digits.

5. Apparatus for recording a digital magnetic code having an indexing digit and information digits on magnetizable members extending circumferentially of a tire carcass or the like in opposite regions thereof comprising:
   a first support effective to support the tire carcass thereon;
   a first plurality of magnetizing members pivotally mounted with respect to said first support and adapted to be positioned circumferentially of one of the magnetizable members and adapted to extend axially into the tire carcass adjacent said one of the magnetizable members;
   a second support;
   a second plurality of magnetizing members pivotally mounted with respect to said second support and adapted to be positioned circumferentially of the other of the magnetizable members and adapted to extend axially into the tire carcass adjacent said other of the magnetizable members;
   one of said magnetizing members of said first plurality being disposed in predetermined alignment with one of said magnetizing members of said second plurality to code the magnetizable members with the indexing digit and the other magnetizing members of said first plurality being differently aligned with respect to the other magnetizing members of said second plurality to code the magnetizable members with the information digits; and
   means for pivoting said first and second pluralities of magnetizing members to extend said magnetizing members into the tire carcass and to withdraw said magnetizing members from the tire carcass.

6. Apparatus for recording a digital magnetic code having an indexing digit and information digits on magnetizable members extending circumferentially of a tire carcass or the like in opposite regions thereof comprising:
   a first support effective to support the tire carcass thereon;
   a first plurality of magnetizing members comprising electromagnets pivotally mounted with respect to said first support and adapted to be positioned circumferentially of one of the magnetizable members and adapted to extend axially into the tire carcass adjacent said one of the magnetizable members;
   a second support;
   a second plurality of magnetizing members comprising electromagnets pivotally mounted with respect to said second support and adapted to be positioned circumferentially of the other of the magnetizable members and adapted to extend axially into the tire carcass adjacent said other of the magnetizable members;

means for selectively energizing said electromagnets;

one of said magnetizing members of said first plurality being disposed in predetermined alignment with one of said magnetizing members of said second plurality to code the magnetizable members with the indexing digit and the other magnetizing members of said first plurality being differently aligned with respect to the other magnetizing members of said second plurality to code the magnetizable members with the information digits; and means for pivoting said first and second pluralities of magnetizing members to extend said magnetizing members into the tire carcass and to withdraw said magnetizing members from the tire carcass.

7. Apparatus for decoding a digital magnetic code including an indexing digit and information digits disposed circumferentially around a tire axis at a radial distance therefrom on members of a tire or the like on opposite sides of the tire with a digit on each member having a predetermined reference to a digit on the other member to represent the indexing digit and with the information digits on each member being differently referenced to each other from the digits representative of the indexing digit comprising:

a pair of synchronously rotatable magnetic pickup means disposed on opposite sides of the tire and rotatable circumferentially of the tire around the tire axis at a radial distance from the tire axis approximately equal to the radial distance of the code digits from the tire axis for developing from said digits representative of the indexing digit electrical code pulses having a predetermined time relation to represent the indexing digit and for developing electrical code pulses representative of the information digits;

an indexing-digit detector;

a pair of rotatable means coupled to said pair of pick-up means and coupled to said indexing-digit detector for translating said electrical code pulses representative of the indexing digit and the information digits to said indexing-digit detector;

means for rotating said pair of pick-up means and said pulse-translating means synchronously;

means coupled to said indexing-digit detector for develop timing pulses;

said indexing-digit detector being selectively responsive to those of said code pulses derived from both members and having said predetermined time relation to represent the indexing digit for actuating said timing-pulse developing means for developing timing pulses representative of the occurrence times of those of said code pulses representative of the information digits; and circuit means coupled to said pair of rotatable pulse-translating means and to said timing-pulse developing means and responsive to said electrical code pulses representative of the information digits and to said timing pulses for separating said last-mentioned code pulses to represent individually the information digits of the magnetic code and for storing said separated pulses to represent the information digits.

8. Apparatus for decoding a binary digital magnetic code including an indexing digit and information digits disposed circumferentially around a tire axis at a radial distance therefrom on bead wires of a tire or the like on opposite sides of the tire with a digit on each bead wire being aligned circumferentially of the tire with a digit on the other bead wire to represent the indexing digit and with the information digits on both bead wires being spaced from each other circumferentially of the tire comprising:

a pair of synchronously rotatable magnetic pick-up means disposed on opposite sides of the tire and rotatable circumferentially of the tire around the tire axis at a radial distance from the tire axis approximately equal to the radial distance of the code digits from the tire axis for scanning the bead wires for developing from said digits representative of the indexing digital electrical code pulses having a substantially simultaneously time relation to represent the indexing digit and for developing electrical code pulses representative of the information digits;

an indexing-digit detector;

a pair of rotatable means coupled to said pair of pick-up means and coupled to said indexing-digit detector for translating said electrical code pulses representative of the indexing digit and the information digits to said indexing-digit detector;

means for rotating said pair of pick-up means and said pulse-translating means synchronously;

means coupled to said indexing-digit detector for developing timing pulses;

said indexing-digit detector being selectively responsive to those of said code pulses derived from both bead wires and having said substantially simultaneously time relation to represent the indexing digit for actuating said timing-pulse developing means for developing timing pulses representative of the occurrence times of those of said code pulses representative of the information digits; and a plurality of circuit means coupled to said pair of rotatable pulse-translating means and to said timing-pulse developing means, each of said circuit means being responsive to said electrical code pulses representative of the information digits and to said timing pulses applied thereto for separating said last-mentioned code pulses to represent individually the information digits of the magnetic code and for storing said separated pulses to represent the information digits, the timing pulses applied to each of said circuit means corresponding in time relationship to code pulses derived from information digits having the same circumferential space relation with respect to the indexing digit under opposite directions of scan of the bed wires, whereby the bead wires may be scanned and the code may be decoded with the tire in reversed positions.

9. Apparatus for decoding a digital magnetic code including an indexing digit and information digits disposed circumferentially around a tire axis at a radial distance therefrom on bead wires of a tire or the like on opposite sides of the tire with a digit on each bead wire being aligned circumferentially of the tire with a digit on the other bead wire to represent the indexing digit and with the information digits on both bead wires being spaced from each other circumferentially of the tire comprising:

a pair of synchronously rotatable magnetic pick-up means disposed on opposite sides of the tire and rotatable circumferentially of the tire around the tire axis at a radial distance from the tire axis approximately equal to the radial distance of the code digits from the tire axis for developing from said digits representative of the indexing digit electrical code pulses having a substantially simultaneous time relation to represent the indexing digit and for developing electrical code pulses representative of the information digits;

an indexing-digit detector;

a pair of rotatable means coupled to said pair of pick-up means and coupled to said indexing-digit detector for translating said electrical code pulses representative of the indexing digit and the information digits to said indexing-digit detector;

means for rotating said pair of pick-up means and said pulse-translating means synchronously;

means coupled to said indexing-digit detector for developing timing pulses;

said indexing-digit detector being selectively responsive to those of said code pulses derived from both bead wires and having said substantially simultaneous time relation to represent the indexing digit for actuating said timing-pulse developing means for developing timing pulses representative of the occurrence times of those of said code pulses representative of the information digits; and circuit means coupled to said pair of rotatable pulse-translating means and to said timing-pulse developing means and responsive to said electrical code pulses representative of the information digits and to said timing pulses for separating said last-mentioned code pulses to represent individually the information digits of the magnetic code and for storing said separating pulses to represent the information digits.

10. Apparatus for decoding a digital magnetic code including an indexing digit and information digits disposed circumferentially around a tire axis at a radial distance therefrom on members of a tire or the like on opposite sides of the tire with a digit on each member having a predetermined reference to a digit on the other member to represent the indexing digit and with the information digits on each member being differently referenced to each other from the digits representative of the indexing digit comprising:

means having a pair of nonmagnetic tire-positioning members of tapered cross section for supporting a a tire, in a predetermined size range, in the bead regions thereof;

a pair of synchronously rotatable magnetic pick-up means disposed on the opposite sides of said tire-positioning members from the tire and rotatable circumferentially of the tire around the tire axis at a radial distance from the tire axis approximately equal to the radial distance of the code digits from the tire axis for developing from said digits representative of the indexing digit electrical code pulses having a predetermined time relation to represent the indexing digit and for developing electrical code pulses pulses representative of the information digits;

an indexing-digit detector;

a pair of rotatable means coupled to said pair of pick-up means and coupled to said indexing-digit detector for translating said electrical code pulses representative of the indexing digit and the information digits to said indexing-digit detector;

means for rotating said pair of pick-up means and said pulse-translating means synchronously;

means coupled to said indexing-digit detector for developing timing pulses;

said indexing-digit detector being selectively responsive to those of said code pulses derived from both members and having said predetermined time relation to represent the indexing digit for actuating said timing-pulse developing means for developing timing pulses representative of the occurrence times of those of said code pulses representative of the information digits; and circuit means coupled to said pair of rotatable pulse-translating means and to said timing-pulse developing means and responsive to said electrical code pulses representative of the information digits and to said timing pulses for separating said last-mentioned code pulses to represent individually the information digits of the magnetic code and for storing said separated pulses to represent the information digits.

References Cited
UNITED STATES PATENTS

| | | | |
|---|---|---|---|
| 3,160,865 | 12/1964 | Tourtellotte | 340—174.1 |
| 3,225,810 | 12/1965 | Enabnit | 152—330 |
| 3,232,330 | 2/1966 | Puls | 152—330 |

BERNARD KONICK, Primary Examiner

V. P. CANNEY, Assistant Examiner

U.S. Cl. X.R.

152—330